United States Patent [19]

Hess

[11] Patent Number: 4,751,670
[45] Date of Patent: Jun. 14, 1988

[54] HIGH INTEGRITY DIGITAL PROCESSOR ARCHITECTURE

[75] Inventor: Richard F. Hess, Scottsdale, Ariz.

[73] Assignee: Honeywell Inc., Minneapolis, Minn.

[21] Appl. No.: 846,312

[22] Filed: Mar. 31, 1986

[51] Int. Cl.[4] .................. G06F 15/50; G06F 11/00; G06F 12/00

[52] U.S. Cl. .................. 364/900; 364/424; 364/200; 371/12

[58] Field of Search .............. 364/424, 200 MS File, 364/900 MS File; 371/12, 8

[56] References Cited

U.S. PATENT DOCUMENTS

| | | | |
|---|---|---|---|
| 3,781,808 | 12/1973 | Ahearn et al. | 364/200 |
| 4,044,337 | 8/1977 | Hicks et al. | 371/12 |
| 4,327,410 | 4/1982 | Patel et al. | 364/200 |
| 4,493,035 | 1/1985 | MacGregor et al. | 371/12 X |
| 4,521,847 | 6/1985 | Ziehm et al. | 364/184 |
| 4,541,050 | 9/1985 | Honda et al. | 364/424 |

OTHER PUBLICATIONS

Barner et al, "Automatic Restart and Checkpoint Retry for an Unattended Earth Station in a Satellite Communication Network", 10/79, pp. 1987–1989, IBM Technical Disclosure Bulletin, vol. 22, No. 5.

Hicks et al, "Instruction Retry Mechanism for a Computer", 1/75, pp. 2239–2242, IBM Technical Disclosure Bulletin, vol. 17, No. 8.

Primary Examiner—Parshotam S. Lall
Assistant Examiner—Thomas G. Black
Attorney, Agent, or Firm—Seymour Levine; Albin Medved

[57] ABSTRACT

A digital data processor architecture immune from digital computer upset including a non-volatile random access memory for storing past and present values of state variables. An index counter is utilized to offset the store and retrieve instruction base addresses to effect the multiple storage of the state variables in the non-volatile memory. A monitor detects disruptions in data processing and vectors the processor to a reinitialization and restart routine in which the past values of the state variables are utilized.

8 Claims, 4 Drawing Sheets

HIGH INTEGRITY DIGITAL PROCESSOR ARCHITECTURE

BACKGROUND OF THE INVENTION

1. Field of the Invention

This invention relates to digital data processors particularly with respect to flight critical avionic equipment.

2. Description of the Prior Art

The stored program digital computer is in widespread usage in a variety of applications. Digital computers are utilized to implement complex banking and business systems as well as in the control of industrial processes. The digital computer is also finding widespread usage in the control of vehicles such as aircraft, spacecraft, marine and land vehicles. For example, in present day automatic flight control systems for commercial and military transports, the digital computer is supplanting the analog computer of prior art technology.

Automatic flight control systems are constrained by Federal Air Regulations to provide safe control of the aircraft throughout the regimes in which the automatic flight control system is utilized. Any failure condition which prevents continued safe flight and landing must be extremely improbable. Present day regulations require a probability of less than $10^{-9}$ failures per hour for flight critical components. A flight critical portion of an automatic flight control system is one, the failure of which will endanger the lives of the persons aboard the aircraft. For example, components of an automatic flight control system utilized in automatically landing the aircraft may be designated as flight critical, whereas, certain components utilized during cruise control may be designated as non-critical. In the prior art systems utilizing analog computers, the safety level of the components of the system had been determined by analysis and testing procedures familiar to those skilled in the art.

In the present day technology of digital automatic flight control systems, it is generally recognized that a digital computer including the hardware and extensive software required for a flight control system application program is of such complexity that the analysis for certification in accordance with Federal Air Regulations is exceedingly more time consuming, expensive and difficult than with the analog computer. The level of complexity and sophistication of the digital technology is increasing to the point where analysis and proof for certification to the stringent safety requirements is approaching impossibility. It is virtually impossible to identify all possible data paths in such systems and therefore conventional failure mode and effects analysis cannot effectively be utilized.

Present day automatic flight control systems utilize data channel redundancy and cross channel monitoring to enhance reliability. A failure in one of the channels is detected by the monitors and the system is disabled. Two dual redundant channels may be utilized for fail operative performance. If one pair is shut down, the other pair can continue with automatic control.

Present day digital computers are comprised of hundreds of thousands of discrete semi-conductor or integrated circuit bi-stable elements generically denoted as latches. A latch is a high speed electronic device that can rapidly switch between two stable states in response to relatively low amplitude, high speed signals. Latch circuits are utilized to construct most of the internal hardware of a digital computer such as the logic arrays, the memories, the registers, the control circuits, the counters, the arithmetic and logic unit and the like. Since present day digital computers operate at nanosecond and subnanosecond speeds, rapidly changing electronic signals normally flow through the computer circuits, such signals radiating electro-magnetic fields that couple to circuits in the vicinity thereof. These signals can not only set desired latches into desired states, but can also set other latches into undersired states. An erroneously set latch can unacceptably compromise the data processed by the computer or can completely disrupt the data processing flow thereof. Functional error modes without component damage in digital computer based systems is denoted as digital system upset.

Digital system upset can also result from spurious electromagnetic signals such as those caused by lightning that can be induced on the internal electrical cables throughout the aircraft. Such transient spurious signals can propagate to internal digital circuitry setting latches into erroneous states. Additionally, power surges, radar pulses, static discharges and radiation from nuclear weapon detonation may also result in digital system upset. When subject to such conditions, electrical transients are induced on system lines and data buses resulting in logic state changes that prevent the system from performing as intended after the transient. Additionally, such electromagnetic transients can penetrate into the random access memory (RAM) area of the computer and scramble the data stored therein. Since such transients can be induced on wiring throughout an aerospace vehicle, reliability functions based on the use of redundant electronic equipment can also be comprised.

The prior art systems utilizing analog computers are generally not susceptable to system upset caused by transient induced signals. When transients penetrate complex analog systems, data may temporarily change but will immediately return to the values that existed prior to the transient after the transient has occurred. Additionally, in digital systems, to eliminate the possibility of destroying or permanently scrambling program instructions stored within digital avionic equipment memories, software resides in read-only memory (ROM) so that even if the logic states of ROM elements are momentarily changed by a transient, they will return to proper values after the transient terminates.

In the prior art, erroneous results caused by digital system upset are often mitigated by re-running the program. This may not be possible in digital systems utilized to control critical functions in aerospace vehicles. For example, the control and logic state variables that may be destroyed during an upset may not be recoverable by a conventional restart procedure. A control state variable is a parameter that is developed over a long period of time having a history associated with it based on sensor data. Such variables are generally developed over long term maneuvering or control of the aircraft. For example, data that is processed through a long time constant filter or through an integrator can only be recovered by maneuvering the aircraft with respect to the same flight path over which the variable was developed. The loss of control state variables for performing flight critical functions can be dangerous. For example, loss of control state variables during a landing procedure can cause a catastrophic system response.

In the same manner, logic state variables utilized in critical functions can be irreversibly compromised by digital system upset. The logic state variables generally relate to the mode control of the system. For example, if the system is latched into the autopilot mode, the processing to be performed on the sensor data is established by the mode. If the mode in which the system is operating is lost during a critical maneuver, a catastrophic situation can be precipitated.

In the prior art utilizing channel redundancy with cross channel monitoring, generally a system that has suffered an upset will be shut down when the result of the upset is detected by the monitors.

SUMMARY OF THE INVENTION

The above disadvantages of the prior art are overcome by including a non-volatile random access memory area in the digital processor system for storing present and past values of the control and logic state variables immune from compromise due to upset. A monitor is included for detecting that an upset has occurred and for initiating a restart operation upon detection of the upset. An indexing means is included for determining the past values of the control and logic state variables to be recalled and utilized upon the initiation of the restart operation. Thus, proper operation is continued after the upset with current uncompromised values of the control and logic state variables.

DESCRIPTION OF THE PREFERRED EMBODIMENT

Figure 1A:
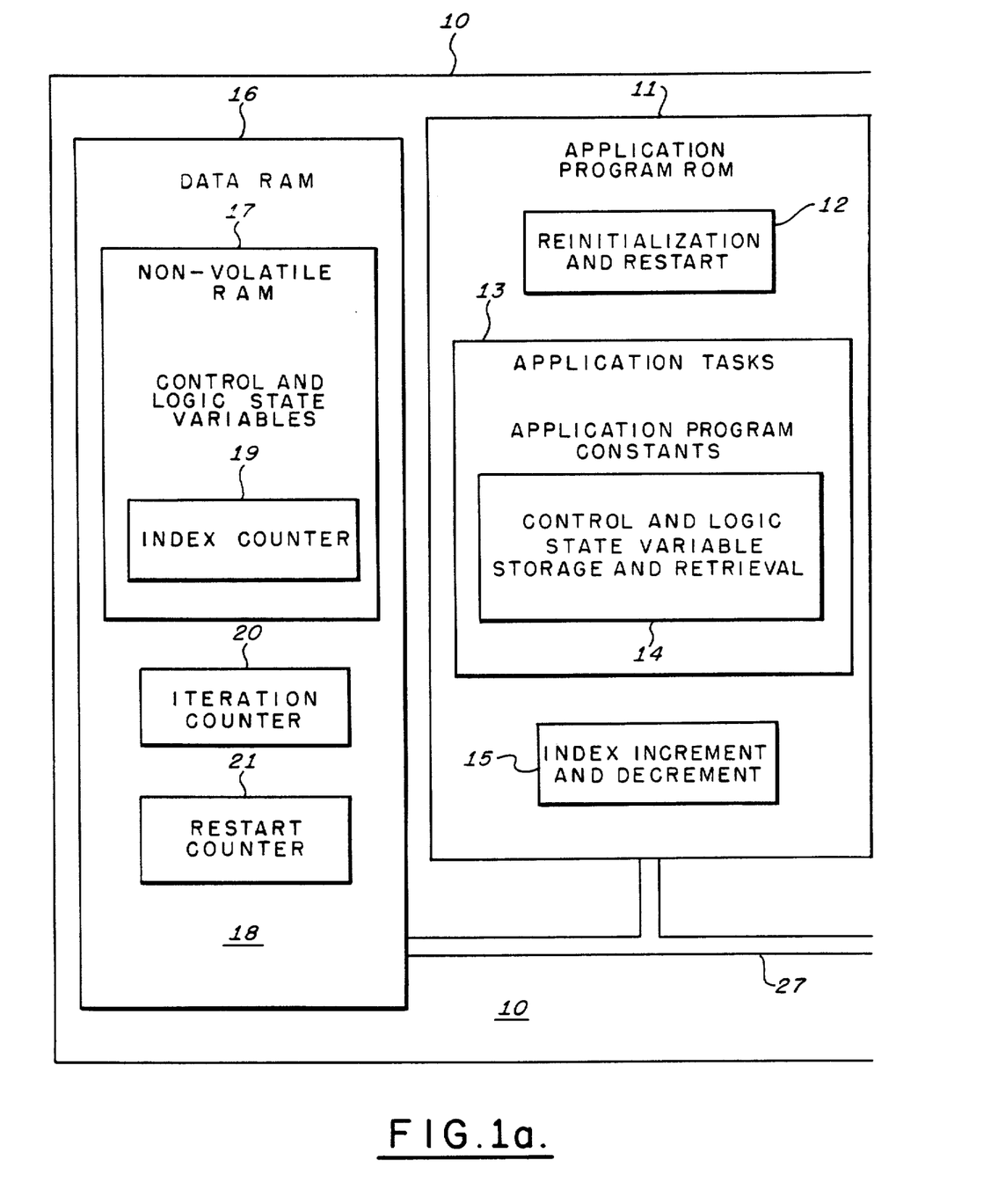
FIGS. 1a and 1b taken together show a schematic block diagram illustrating the novel computer architecture of the present invention.
Figure 1B:
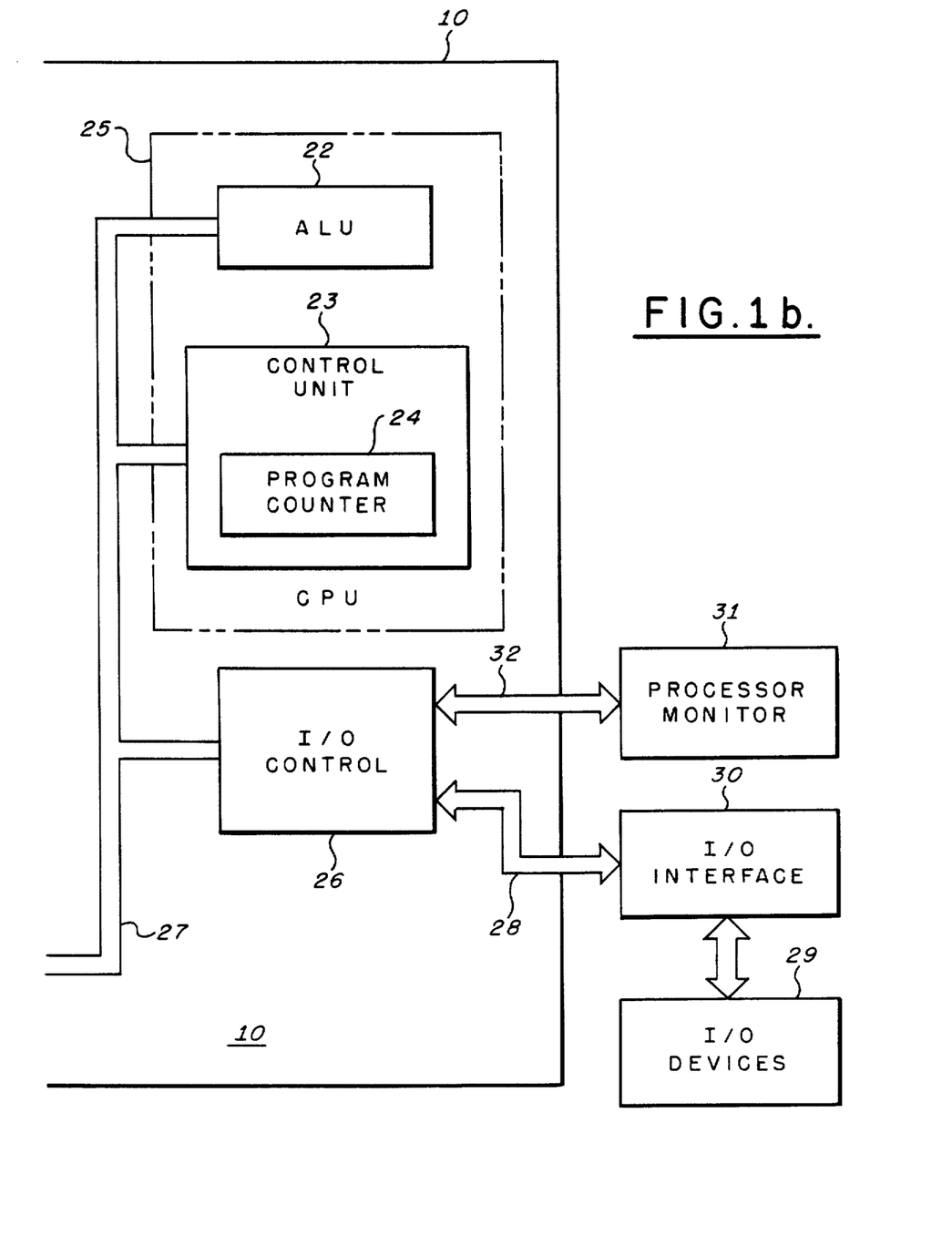

Referring to FIG. 1, a digital computer 10 implemented in accordance with the architecture of the present invention is illustrated. The computer 10 includes an application program ROM 11 for storing the operative program for performing all of the functions required by the computer 10 in the application in which it is utilized. If the computer 10 is utilized in an automatic flight control system, the operative program will include all of the functions required thereby. The operative or application program includes a reinitialization and restart location 12 to which program control is vectored pursuant to recovery from an upset in a manner to be explained. The application program ROM 11 also includes the application task program segments 13 for controlling the various tasks required by the operative program and the constants utilized by the application program. The application task routines 13 includes a storage and retrieval portion 14 for storing and retrieving the control and logic state variables utilized in the operative program. The program section 14 is schematically representative of the retrieve and store instructions in the various application tasks utilized for calling and storing the control and logic state variables utilized in the tasks. Thus it is appreciated that the storage and retrieval functions performed by the block 14 are distributed throughout the operative program.

The application program ROM 11 also includes an index increment and decrement section 15 for incrementing and decrementing an index value that is utilized for storing and retrieving the control and logic state variables in accordance with the invention in a manner to be described.

It is appreciated that the software stored in the ROM 11 is protected from destruction or permanent scrambling from upset phenomena because even if the logic states of the ROM elements are momentarily changed by a transient, they will return to proper values after the transient terminates.

The computer 10 also includes a data RAM 16 for storing the variables utilized by the application program stored in the ROM 11. The RAM 16 contains predetermined locations for the storage of the various types of data provided to the computer 10 from the external environment. The variables to be processed comprise state variables such as control and logic state variables as well as standard data. In accordance with the invention the data RAM 16 includes a non-volatile RAM 17 for storing the control and logic state variables and a volatile RAM 18 for storing the standard data. For example, in an automatic flight control system application, the non-volatile RAM 17 may include a location dedicated to the storage of the glide slope beam integrator. For reasons to be later discussed, the non-volatile RAM 17 stores present and past values of the control and logic state variables utilized in the application program. The non-volatile RAM 17 is illustrated within the data RAM 16. Although the non-volatile RAM 17 forms a logical part of the data RAM 16, the non-volatile RAM 17 may be a separate memory structure within the computer 10.

The data RAM 16 as well as the non-volatile RAM 17 forming a part thereof, are conventional read/write random access memories, a variety of which are commercially procurable for utilization in implementing the present invention. The non-volatile RAM 17 should be of the type that, with the exception of the location in the process of being updated, would suffer memory device damage before data stored in the device would be compromised by an external event such as a transient from a harsh electromagnetic environment that penetrated the memory device. Data preservation in the non-volatile RAM 17 is predicated upon the ability of the device to store large levels of energy such as electric, magnetic, FM-photon, relative to that contained in an interferring agent. Thus it is appreciated that the non-volatile RAM 17 provides high integrity non-volatile storage for the control and logic state variables in the presence of harsh environments that may cause digital computer upset.

In accordance with the invention, the present as well as past values of the control and logic state variables are stored and retrieved from the non-volatile RAM 17. An index counter 19 is utilized to index the reading and writing accesses to the non-volatile RAM 17 by providing an offset that is added to the base address of the location in RAM 17 of a state variable to provide for the multiple storage thereof. When a state variable is processed by the application program, the retrieve and store instructions associated therewith provide the base address therefore. The index value provided by the counter 19, which value is incremented during each program iteration, steps the storage and retrieval of the state variable through multiple locations in the non-volatile RAM 17. When an upset is detected and the application program is vectored to the reinitialization and restart location 12, the index counter 19 is decremented so that the current past values of the control and logic state variables are retrieved and utilized in the reinitialization and restart procedure. The past values are employed because the upset may have occurred during a writing procedure to the non-volatile RAM 17 resulting in an uncertainty in the integrity of the present values.

The index counter 19 is preferably implemented by a dedicated location in the non-volatile RAM 17. Alternatively, the index counter 19 may be implemented by a dedicated non-volatile hardware element in the computer 10. The index counter 19 is preferably implemented as a grey code counter where only one counter bit is active at a time for incrementing or decrementing the grey code count. Since the grey code value is only vulnerable in the bit position that is being updated, the integrity of the index value, during a processor upset, is preserved. Thus because of the grey code property of incrementing and decrementing the count by changing only one bit position, it is only the next count that is disrupted upon an upset, the previous count being uncompromised and therefore appropriate for utilization in the reinitialization and restart process.

As previously described, the index counter 19 provides an offset that is added to the base address for the storage or retrieval of a state variable to obtain the current location in the non-volatile RAM 17, thereby providing multiple storage of the variable. It is appreciated that the index counter 19 may also be implemented as a single stage counter that toggles the location for a variable between two addresses, during each iteration of the application program, for storing a present value and a past value thereof.

It is appreciated that the index counter 19 and the non-volatile RAM 17 provide the capability to the computer 10 of restoring state variables to legitimate previous values upon recovery from the occurance of a processor disruption or disturbance. The index counter 19 locates in the non-volatile RAM 17 the past values of the control and logic state variables that are required to initialize a restart of software execution.

The data RAM 16 provides a dedicated location for an iteration counter 20 for maintaining a count of the number of uninterrupted iterations of the application program for reasons to be discussed. The data RAM 16 also includes a location for a restart counter 21 for counting the number of consecutive times that the reinitialization and restart routine is entered for reasons to be discussed. It is appreciated that although the counters 20 and 21 are illustrated as included within the data RAM 16, separate dedicated hardware counters may be utilized in the computer 10.

The computer 10 includes an arithmetic and logic unit (ALU) 22 for performing the conventional arithmetic and logical operations for the computer 10 as required by the application program. The ALU 22 is commonly referred to as a microprocessor. As the ALU 22 performs the arithmetic and logical operations during execution of the application program, the control and logic state variables are retrieved from the non-volatile RAM 17 from base addresses offset by the index value from the index counter 19. The control and logic state variables are similarly stored in the non-volatile RAM 17 as they are generated by the ALU. Thus, when a particular function is computed in the application program, the present and past values of the control and logic state variables associated therewith are updated in the non-volatile RAM 17.

The digital computer 10 includes a conventional control unit 23 which includes a program counter 24. The control unit 23 controls the program flow of the application program stored in the ROM 11 as well as performing miscellaneous overhead tasks associated with the digital computer 10 such as memory accessing, interrupt handling, resetting and restarting data processing, and the like. The program counter 24 sequentially fetches the instructions of the application program from the ROM 11 and controls the computer 10 to perform the instructions, fetching data from the data RAM 16 when required. The control unit 23 controls the ALU 22 to perform the arithmetic and logical operations required by the program. The combination of the control unit 23 and the ALU 22 is often referred to as a central processing unit (CPU) which is designated by the reference numeral 25.

The digital computer 10 also includes an input/output (I/O) control unit 26 that accepts digital and discrete input signals from peripheral devices and provides digital output signals and discrete signals thereto. The ROM 11, RAM 16, ALU 22, control unit 23 and I/O control unit 26 are all interconnected by a bus 27 for two-way communication therebetween.

The digital computer 10 receives data from a system in which it is incorporated and provides data thereto via the I/O control unit 26 through a bus 28. The plurality of input devices that provide data to the computer 10 and the plurality of output devices that receive data therefrom are schematically represented by I/O devices 29. In an automatic flight control system, the input devices comprise the plurality of digital and analog sensors that provide flight data, aircraft status and control surface position signals to the computer 10. The data RAM 16 including non-volatile RAM 17 contains predetermined locations for the storage of the various types of data provided by the I/O devices 29. Typical output devices comprise the control surface positioning servos, the displays and instrumentation, and the like. The signals transmitted between the I/O devices 29 and the computer 10 are processed in I/O interface circuitry 30. The I/O interface circuitry 30 adapts the input data from the external environment through appropriate data conversion and conditioning circuits for entry into the system. The I/O circuitry 30 similarly prepares the digital data from the processor 10 for application to the associated output devices. The I/O interface circuitry 30 includes such conventional elements as digital-to-analog converters, analog-to-digital converters, synchro data converters, demodulators, serial-to-parallel converters, parallel-to-serial converters and the like. It is appreciated that data to be processed and data that has been processed may be transmitted between the I/O devices 29 and the processor 10 alternatively through a conventional direct memory access systems (DMA) as is well understood in the art.

Further in accordance with the invention, a processor monitor 31 is included which detects disruption of data processing in the computer 10 and provides a restart control signal to the I/O control unit 26 via a bus 32. The restart control signal from the processor monitor 31 reinstitutes execution of the application program stored in the ROM 11 by vectoring the digital processor 10 to the reinitialization and restart location 12 of the application program. The restart signal from the monitor 31 initializes the program counter 24 so as to restart software execution. In the resumption of the data processing cycle, the processor monitor 31 is reset by a reset signal provided to the monitor 31 from the I/O control unit 26 via the bus 32. If the source of interference that caused the data processing disruption continues to persist, further cycling through the vector to re-initialization and restart 12 will occur.

Thus the processor 10 can recover from a transient upset as well as detect and react to long term disturbances such as a hard failure. The processor monitor 31 monitors the status of the computer 10 verifying data processing integrity by providing a signal, in the absence of an upset, that no disruptions in data processing have occurred. The bus 32 includes an interrupt line dedicated to the processor monitor 31 for transmitting the restart signal to the I/O control unit 26. Since the processor disruption could be caused by a transient disturbance, the processor 10 issues a reset discrete to the processor monitor 31 to clear the fail status thereof. This reset signal is issued by the processor 10 to the monitor 31 via a discrete line included in the bus 32.

The processor monitor 31 primarily monitors proper program flow by, for example, comparing unique characteristics that result when the application program is executed with the actual results of program execution. A processor monitor suitable for use in the present invention is disclosed in U.S. Pat. No. 4,115,847 issued Sept. 19, 1978 entitled "Automatic Flight Control System with Operatively Monitored Digital Computer" assigned to the Assignee of the present invention. Alternatively, a suitable processor monitor is disclosed in the proceedings of the International Aerospace and Ground Conference on Lightning and Static Electricity, Fort Worth, Tex. (Jun. 1983) in a paper entitled "Monitors for Upset Detection of Computer Systems" by M. E. Schmid, R. L. Trapp, G. M. Mason, and A. E. Davidoff. The processor monitor 31 may be of the type that provides a continuous train of pulses during normal operation but will omit the generation of one or more pulses upon the occurance of an upset. The processor monitor 31 actuates in response to disruptions of data processing due to digital computer upset.

Figure 2A:
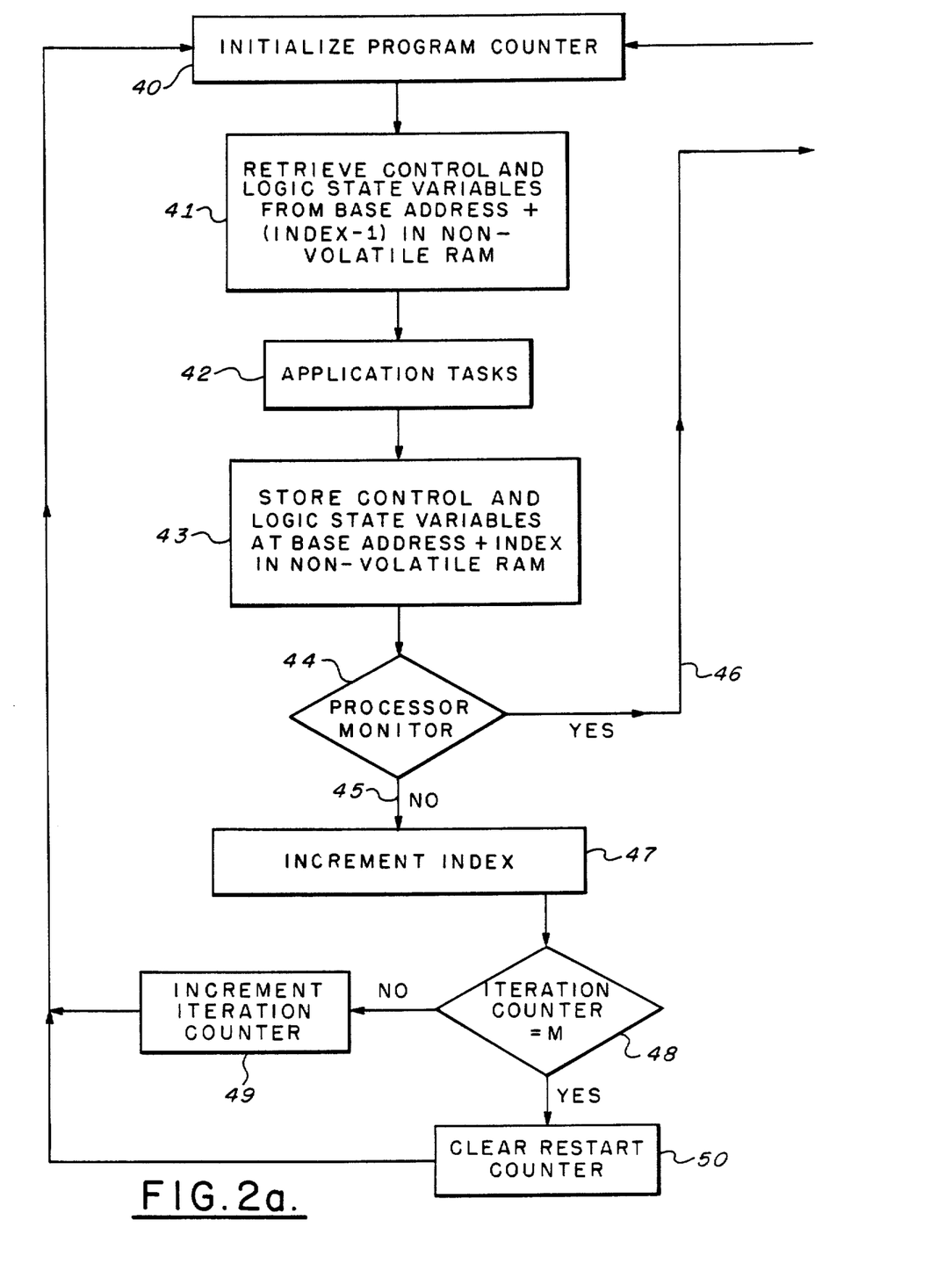
FIGS. 2a and 2b taken together show a flow chart of the operations performed in practicing the present invention.
Figure 2B:
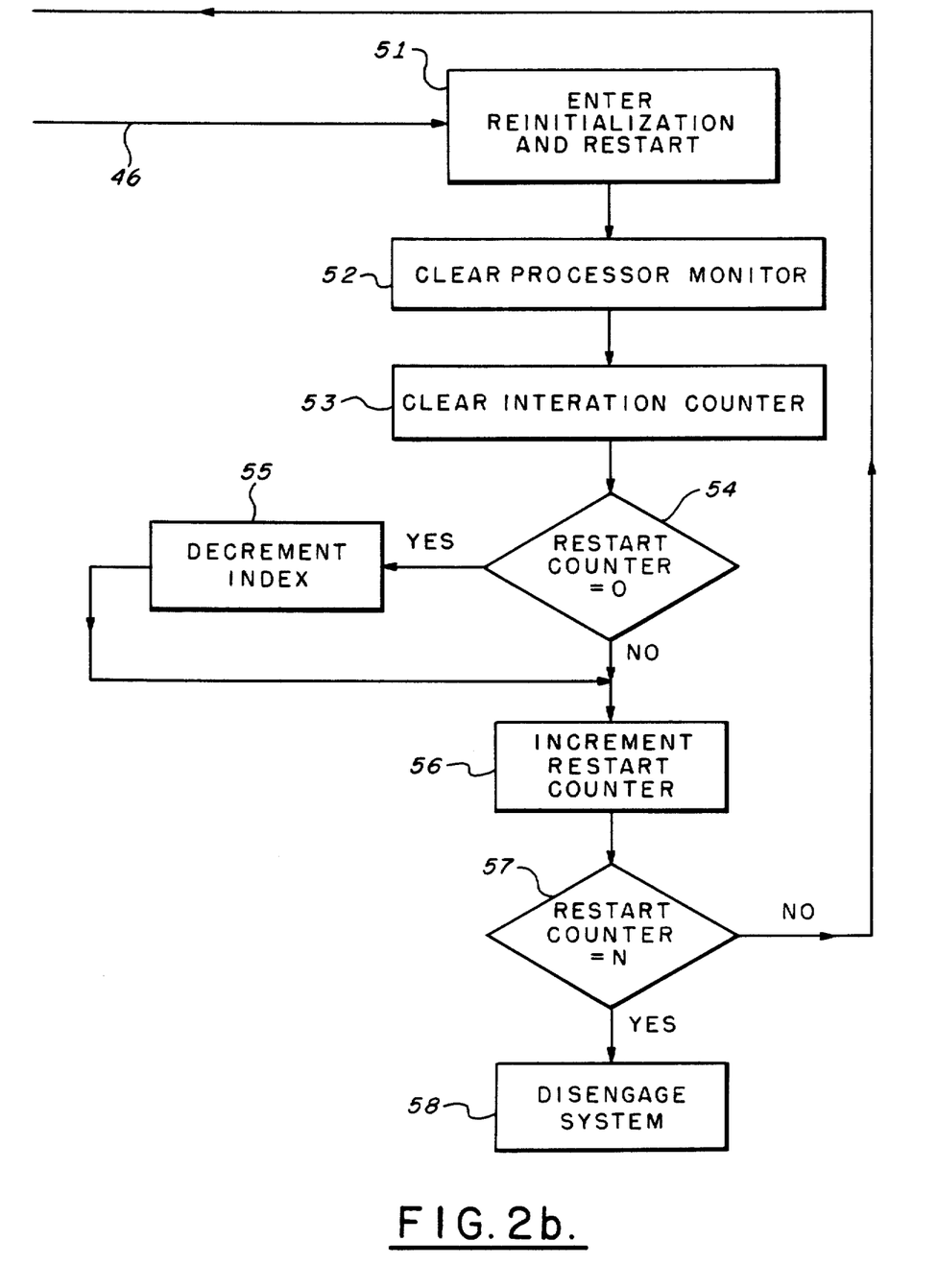

Referring to FIG. 2, a flow chart of the operations performed in practicing the invention is illustrated. Software execution is initiated at a block 40 by setting the program counter 24 to the location in the ROM 11 at which program execution begins.

Under control of the control unit 23 and program counter 24, program execution proceeds to a block 41 schematically representative of the program segments that retrieve the control and logic state variables from the non-volatile RAM 17. The block 41 is representative of the various retrieve instructions imbedded in the application tasks for retrieving the state variables. The retrieve instruction includes a base address in the non-volatile RAM 17 associated with the state variable to be retrieved. The retrieve routine subtracts unity from the index value in the index counter 19 and adds this offset to the base address in the instruction. This computed address is the location in the non-volatile RAM 17 from which the associated state variable is retrieved.

The next block in the schematic program flow of FIG. 2 is an application tasks block 42. The application tasks block 42 is representative of the performance of the application tasks represented by the block 13 in the ROM 11. The next section of the schematic program flow of FIG. 2 is a block 43 representative of storing the control and logic state variables in the non-volatile RAM 17 after processing by the application tasks 42. Each store instruction in the storage routine 43 includes a base address in the non-volatile RAM 17 associated with the processed state variable. The processed state variable value is stored at a location in the non-volatile RAM 17 computer by adding the index value from the index counter 19 to the base address in the store instruction. Thus, the retrieve and store routines 41 and 43 utilize the index value in the index counter 19 as an offset to compute an indexed address for the storage and retrieval of the state variables in the non-volatile RAM 17. It is appreciated that the retrieval and storage routines 41 and 43 are schematically represented by the block 14 in the application program ROM 11.

After all of the application tasks are performed utilizing the state variables pursuant to the blocks 41-43, the program flow progresses to a processor monitor decision block 44. At this point in the program the software tests the interrupt line on the bus 32 from the processor monitor 31 to determine if an upset has occurred. If no upset has occurred, the program flow continues on a path 45. If, however, an upset has occurred, program flow continues on a path 46.

In the absence of an upset, the path 45 leads to an increment index block 47 in which the index counter 19 is incremented to the next grey code count. Thereafter, program flow enters an iteration counter decision block 48 in which the iteration counter 20 is tested to determine if it has attained a count M. The iteration counter 20 maintains a count of the number of uninterrupted successful cycles of software execution accomplished after an upset. The criteria for the number M is a design choice depending on the particular application. Alternatively, if the processor monitor 31 is of the type that provides a continuous train of pulses in the absence of an upset and omits pulses when an upset occurs, the iteration counter 20 may be utilized to count contiguous monitor pulses.

If the iteration counter 20, tested by the block 48, has not attained the count M, program flow progresses to a block 49 pursuant to which the iteration counter 20 is incremented. If, however, the iteration counter 20 has attained the count M, program flow proceeds to a block 50 in which the restart counter 21 is cleared. The count accumulated in the restart counter 21 determines if the processor 10 is invalid. This count is not cleared unless the appropriate number M of uninterrupted successful cycles of software execution have been accomplished pursuant to the test performed in the decision block 48. After performing the functions of block 49 or block 50, control returns to the initializing block 40.

If, during the test performed in the block 44, the processor monitor 31 indicates that an upset has occured, control is vectored to the reinitialization and restart routine entered schematically at a block 51. At a block 52, the processor monitor 31 is cleared so as to be enabled for detecting further or continuing upsets. The iteration counter 20 is then cleared at a block 53. The iteration counter 20 is cleared during each entry into the reinitialization and restart routine so that the iteration counter 20 may thereafter count the uninterrupted cycles of software execution.

Program flow then enters a restart counter decision block 54 to determine if the restart counter 21 is in a cleared condition. If the restart counter 21 is cleared, the index counter 19 is decremented by unity pursuant to a block 55. If the restart counter 21 is not in a cleared condition, the program flow enters a block 56. The block 56 is also entered after performing the index decementation of block 55. Decision block 54 is utilized so that the index counter 19 will not be continually decremented during repetitive vectoring into the reinitialization and restart operating mode. It is appreciated that the increment index block 47 and the decrement index block 55 are schematically represented in the ROM 11 by the program segment 15. The index value in the index counter 19 is incremented during each computation cycle.

In the block 56 the restart counter 21 is incremented by unity and thereafter program flow enters a restart counter decision block 57. In the block 57, the restart counter 21 is tested to determine if it has attained the count N. If the count N has not been attained, program flow returns to the initialization block 40. If the count N has been attained, the system enters a disengage system block 58 whereby the digital processor 10 is disabled in an appropriate manner generally requiring human intervention. For example, human intervention may be required to restart processing such as by manually recycling power to the processor 10. Alternatively, the automatic flight control system in which the processor 10 is utilized may be disengaged and locked out. It is appreciated that the quantity N represents the number of processing resumption attempts and preferably is in the range between approximately three and ten. A nominal quantity for N would be approximately five unsuccessful restart attempts.

Thus, it is appreciated that if the source of interference that caused the processing disruption continues to persist, repetitive cycling through the vector to reinitialize and restart will occur. After the appropriate number of processing resumption attempts selected by the restart counter decision block 57, the digital processor 10 is disabled. The count in the restart counter 21 being accumulated for determining the processor to be invalid is not cleared in the block 50 unless an appropriate number of uninterrupted successful cycles of software execution have been accomplished as determined by the block 48.

For particular state variables, it might be desirable to decrement the index counter 19 by more than unity when entering the reinitialization and restart routine depending on the application. This would be achieved by appropriate modifications in the blocks 54 and 55.

Present day commercially available non-volatile RAMS have endurance parameters associated therewith. Only a predetermined number of read operations and write operations can be performed at each memory location before the location is exhausted. The architecture of the present invention tends to obviate this exhaustion factor by distributing the storage of the state variables throughout the non-volatile RAM 17 by means of the continually incremented index counter 19.

The present invention provides offset information for organizing the non-volatile RAM 17 into pages and for the multiple storage of state variable data within a page. This organization permits the efficient organization of time frames for the computation of the state variables and of the time usage of the computing resources thereby enhancing the processing capability of the digital processor 10. State variables that change at varying rates may be organized into such RAM pages so that the variables that change infrequently will be correspondingly updated infrequently. This results in efficient utilization of the processor 10 as well as the minimization of the reading and writing operations into the RAM 17, thereby increasing the endurance thereof. The application software may be organized into, for example, ten millisecond tasks, one-hundred millisecond tasks; one-half second tasks and one second tasks.

It is appreciated from the foregoing that the invention provides high integrity data processing that is virtually immune to the effects of processor disruptions. The invention is primarily utilized where digital processing is required to perform functions involving safety and to achieve a high degree of immunity to transient or momentary upsets of the data being processed. Thus the invention provides a digital computer that accommodates random disruptions in processor operation in order to obtain consistantly reliable data from the processor. The digital processor architecture of the present invention provides the degree of data reliability required for equipment involved in critical applications such as that associated with aerospace vehicles and flight critical functionality.

The ability provided by the present invention to automatically detect disruptions in data processing, initialize the processing cycle, recover all critical variables, and resume processing, results in a digital processor as immune as an analog data processor to disruptions of the computed functions. Even though digital processor operation may be disrupted momentarily on a micro time basis, proper operation of the computer will not be significantly effected and the disruption will be transparent as though it had never occurred, from a macro time perspective. A digital processor with the architecture of the present invention is inherently immune to harsh changes in the external environment such as lightning, nuclear weapon detonation and pulsed radar.

In the prior art, digital computer systems disrupted by an upset are traditionally shut down. The present invention permits continued operation. An automatic flight control system channel containing a single computer is rendered fail-safe by the utilization of the invention of said U.S. Pat. No. 4,115,847. Such a channel is rendered fail-operative by utilizing the present invention.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Digital data processing apparatus for processing data including state variable comprising
    non-volatile random access memory means for receiving and storing present and past values of said state variables,
    digital data processing means having an applications program with instructions for storing and retrieving said state variables in said non-volatile random access memory means, each instruction having a base address,
    monitor means coupled to said digital data processing means for detecting a disruption of data processing in said digital data processing means, for providing an increment signal when a disruption has not been detected, and for providing a decrement signal and initiating a restart operation in said digital data processing means upon detection of a disruption,
    index means coupled to said monitor means for providing an index code incremented in response to said increment signal and decremented in response to said decrement signal, and means coupled to said index means and said non-volatile random access means for adding said index code to said base addresses so that storage of said state variables is distributed throughout said nonvolatile random access memory in response to said increment signals and a previously stored state variable is accessed in response to said decrement signals.

2. The apparatus of claim 1 in which said index code is a grey code counter.

3. The apparatus of claim 1 further including an iteration counter for maintaining a count of consecutive uninterrupted iterations of said application program.

4. The apparatus of claim 3 further including a restart counter for maintaining a count of restart operations initiated before a predetermined number of application program iterations have occurred and further including means coupled to said restart counter for disabling said digital data processing means when a preselected count of restart operations is reached.

5. The apparatus of claim 4 further including means for resetting said restart counter when said iteration counter has counted said predetermined number.

6. The apparatus of claim 5 further including means for incrementing said reset counter during each restart operation.

7. The apparatus of claim 6 further including means for disabling said digital data processing means when said restart counter attains a predetermined count.

8. The apparatus of claim 1 in which said apparatus is utilized in an automatic flight control system.

* * * * *